Patented May 15, 1923.

1,455,072

UNITED STATES PATENT OFFICE.

HYYM E. BUC, OF ROSELLE, NEW JERSEY, ASSIGNOR, BY MESNE ASSIGNMENTS, TO STANDARD DEVELOPMENT COMPANY, A CORPORATION OF DELAWARE.

DEHYDRATION OF ALCOHOL.

No Drawing. Application filed October 21, 1921. Serial No. 509,408.

*To all whom it may concern:*

Be it known that I, HYYM E. BUC, a citizen of the United States, residing at Roselle, in the county of Union and State of New Jersey, have invented a new and useful Improvement in the Dehydration of Alcohol, of which the following is a specification.

In effecting the dehydration of alcohol by means of lime it has hitherto been impossible to effect a complete recovery of the alcohol, since at least a portion of the alcohol enters into an intimate physical or chemical relationship with the lime. If a sufficiently high temperature is employed to recover all of the alcohol, some decomposition of the hydrated lime ensues, and water passes over with the alcohol.

In accordance with the present invention complete dehydration of the alcohol is effected in the following manner: The alcohol is mixed with 20% to 50% of a suitable hydrocarbon oil, such as kerosene, naphtha naphtha bottoms, gas oil or the like. Where clean separation of the dehydrated alcohol and hydrocarbon is desired, it may be facilitated by the use of a hydrocarbon oil of materially higher boiling point than the alcohol, for example, kerosene. A slight excess of lime (CaO) is added to the mixture, which is boiled under a reflux condenser until the dehydration of the mixture is effected. The mixture is then distilled, and if it is desired to collect the alcohol separately, the vapors are suitably fractionated. The alcohol may be completely recovered, the hydrocarbon oil preventing its adherence to or combination with the lime. If desired the dehydrated alcohol and hydrocarbon oil vapors may be condensed together, the resulting mixture being suitable for use, for example, for admixture with gasoline in motor fuels.

The following specific example illustrates the practice of this invention.

A suitable quantity of ethyl alcohol (95%) is admixed with at least 20% and preferably 25% by volume of above 43° Bé. kerosene. From 20% to 50% of the kerosene may be employed. An excess of lime is added, say at least 10% to 15% more than the amount required to combine with the water in the alcohol, and the mixture is then boiled under a reflux condenser for at least two to three hours, preferably for about 7 hours. The mixture is then distilled. If pure absolute alcohol is desired, the vapors may be fractionated; or, they may be condensed together. The recovery of the alcohol is substantially complete.

If desired, the alcohol subjected to the present process may be denatured alcohol, in which case a dehydrated or absolute denatured alcohol will be produced. Thus it may be satisfactorily employed with alcohol denatured with benzol (5 to 10%), pyridine, wood alcohol, or other suitable denaturant. It will be understood, therefore, that in the claims hereunder, the term alcohol is intended to include the denatured material as well as the pure.

After the alcohol has been distilled from the lime and kerosene, the latter may readily be removed with the aid of an inert gas under pressure, for example a hydrocarbon gas, such as high pressure refinery gas, natural gas or the like. Heat is preferably applied to facilitate the vaporization of the kerosene. The distilled kerosene may, if desired, be condensed and collected. The lime may be regenerated by calcining in any suitable manner.

I claim:

1. The process of dehydrating alcohol which comprises admixing hydrocarbon oil with the alcohol to be dehydrated, heating the mixture with lime, and distilling off the dehydrated alcohol.

2. The process of dehydrating alcohol which comprises mixing with the alcohol a hydrocarbon oil having a higher boiling point than the alcohol to be dehydrated, heating the mixture with lime and distilling off the dehydrated alcohol.

3. The process of dehydrating alcohol which comprises mixing 20% to 50% of kerosene with the alcohol to be dehydrated, heating the mixture with lime, and distilling off the dehydrated alcohol.

4. The process of dehydrating alcohol which comprises mixing 20% to 50% of kerosene with the alcohol to be dehydrated, heating the mixture with lime, distilling the mixture and separately condensing the dehydrated alcohol.

5. The process of dehydrating alcohol which comprises admixing hydrocarbon oil with the alcohol to be dehydrated, heating the mixture with lime, distilling off the dehydrated alcohol, and subsequently heating the residual mixture while passing a current of inert gas therethrough, thereby removing the kerosene.

HYYM E. BUC.